US006958199B2

(12) United States Patent
Nemoto

(10) Patent No.: US 6,958,199 B2
(45) Date of Patent: Oct. 25, 2005

(54) BATTERY

(75) Inventor: Seiji Nemoto, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 191 days.

(21) Appl. No.: 09/739,326

(22) Filed: Dec. 19, 2000

(65) Prior Publication Data

US 2001/0014418 A1 Aug. 16, 2001

(30) Foreign Application Priority Data

Dec. 20, 1999 (JP) .......................................... 11-361927

(51) Int. Cl.$^{7}$ ................................................ H01M 2/30

(52) U.S. Cl. ............................ 429/179; 429/1; 429/178

(58) Field of Search ................................ 429/178–184, 429/1

(56) References Cited

U.S. PATENT DOCUMENTS 3,977,907 A * 8/1976 Roth et al. .................. 429/121
4,563,626 A * 1/1986 Ohtake ....................... 320/103
6,322,921 B1 * 11/2001 Iwaizono et al. ............. 429/56

FOREIGN PATENT DOCUMENTS

| | | | |
|---|---|---|---|
| JP | 63-015637 | * | 1/1988 |
| JP | 3037753 | U | 4/1991 |
| JP | 05-089911 | A | 4/1993 |
| JP | 7-89718 | B2 | 7/1995 |
| JP | 07-335271 | A | 12/1995 |
| JP | 8-222201 | * | 8/1996 |
| JP | 3035074 | U | 12/1996 |

* cited by examiner

*Primary Examiner*—Jonathan Crepeau
(74) *Attorney, Agent, or Firm*—Sughrue Mion, PLLC

(57) ABSTRACT

A battery is provided with a battery body and a single input-output terminal fixed thereto which has a positive terminal and a negative terminal electrically insulated from each other. Because of such a structure of the battery, it can be easily connected to an electric appliance using the battery.

12 Claims, 5 Drawing Sheets

BATTERY

FIELD OF THE INVENTION

This invention relates to a battery and its input-output terminal.

BACKGROUND OF THE INVENTION

Today, in the modern society, batteries are one of the key electric parts indispensable as power sources for various electric appliances. Among them, a demand for the secondary battery whose charge/discharge can be repeated is steadily increasing.

The main secondary battery which has been put into practice includes a lead acid battery, a Ni—Cd (nickel—cadmium) battery, a Ni—MH (nickel-metal hydride) battery, a silver-zinc oxide battery, a lithium ion battery, etc.

The lead acid battery, in which lead dioxide is used as a positive active material, lead is used as a negative active material and dilute sulfuric acid is used as an electrolyte, has an operating voltage of 2 V. The lead acid battery has a good balance in quality, reliability and cost, and therefore is widely used for a motor vehicle, an electric vehicle, a UPS (uninterrutible power supply), etc. Further, since a technique of compact sealing has been developed in recent years, usefulness of the lead acid battery has been increased.

The Ni—Cd battery, in which nickel oxyhydroxide is used as a positive active material, cadmium is used as a negative active material and potassium hydroxide aqueous solution is used as an electrolyte, has an operating voltage of about 1.2 V. The Ni—Cd battery has features of a small internal resistance, allowability of large current discharge, long cycle life, resistance to excessive charge/discharge, and wide range of using temperature, etc. has been widely used for various consumer appliances.

The Ni—MH battery, in which nickel oxyhydroxide is used as a positive active material, a hydrogen storage alloy is used as a negative active material and potassium hydroxide aqueous solution is used as an electrolyte, has an operating voltage of about 1.2 V. The Ni—MH battery having a feature of a high energy density has been mainly put into practice for various consumer appliances.

The silver oxide zinc battery, in which silver oxide is used as a positive active material, zinc is used as a negative active material, and potassium hydroxide aqueous solution is used as an electrolyte, has features of a high output and a high energy density, but a defect of high cost. Therefore, its larger scale type has been mainly used for space and deep-sea equipment, whereas its small scale type has been widely used for a watch or an electronic calculator.

The lithium ion battery, in which Li-metal composite oxide such as $LiCoO_2$, $LiNiO_2$, $LiMn_2O_4$, etc. is used as a positive active material, a carbonaceous material is used as a negative electrode and an organic solution is used as an electrolyte, has an operating voltage of 3 V level. The lithium ion battery, which has features of a high operating voltage, high energy density and no memory effect, has been explosively used for consumer appliances.

Regardless of the primary battery and secondary battery, the batteries described above have been provided in the form of a rectangle, cylinder, button, sheet, etc. and adopted various output terminals according to the electric appliance in which the battery is used.

FIG. 1 is an appearance view of a prior art rectangular battery which has been widely used for motor vehicles. As seen from FIG. 1, two cylindrical positive and negative terminals 1*a* and 1*b* are provided convexly from the upper surface of the battery.

FIGS. 2A and 2B are sectional views of other prior art cylindrical batteries. Specifically, FIG. 2A shows two pin-like output terminals 1*a* and 1*b* provided convexly from the upper surface. FIG. 2B shows a single pin-like output terminal 1*a* with one polarity provided convexly from the upper surface and a bottomed cylindrical metallic battery vessel 2*a* which is used as an output terminal with another polarity.

FIG. 3 is an appearance view of still another prior art flat rectangular battery in which a protrusive terminal 3 attached to the one surface is used as an output terminal with one polarity and a bottomed rectangular battery vessel 2*b* is used as an output with another polarity.

FIG. 4 is a partially cut-away view of a further prior art flat battery in which two plate-like terminals 1*a* and 1*b* are attached to the one edge of a flat sack-shape battery vessel 2*c*.

Conventionally, connection between the battery and the appliance using the battery has been made in a manner of connection by two wires and providing the appliance with two contacts. Therefore, there have been problems of troublesome connecting operations and complicated design of the arrangement of the terminals on the instrument. There has been another problem that the demand of arranging positive and negative output terminals on the one end face of the battery cannot be realized because the diameter of the battery is small. This invention has been accomplished in order to solve these problems.

SUMMARY OF THE INVENTION

An object of this invention is to provide a battery having an input-output terminal which can facilitate the connection of the battery and an electric appliance using it.

The first aspect of the invention is a battery comprising a battery body and a single input-output terminal fixed thereto, wherein said input-output terminal includes a positive terminal and a negative terminal which are electrically insulated from each other. It should be noted that the input-output terminal serves as a terminal for supplying power from the battery to an appliance using the battery, and serves as a charging terminal in a secondary battery. This applies to the following aspects.

The second aspect is a battery according to the first aspect, wherein said input-output terminal is provided convexly from said battery body.

The third aspect is a battery according to the first or second aspects, wherein said input-output terminal is a single-head plug. Incidentally, the single-head plug refers to a plug in which the positive terminal and the negative terminal electrically insulated from each other are arranged in the form of a single pin, as provided in, for example, JIS-C-6560. However, it may be any plug as long as the positive terminal and the negative terminal electrically insulated from each other are arranged in the form of a single pin, and is not limited to that provided in JIS-C-6560.

The fourth aspect is a battery according to the first or second aspects, wherein said input-output terminal is a single-head jack. Incidentally, the single-head jack refers to a jack receiving the corresponding single-head plug as provided in, for example, JIS-C-6560. However, it may by any jack adapted to the plug in which the positive terminal and the negative terminal electrically insulated from each other are arranged in the form of a single pin, and is not limited to that provided in JIS-C-6560.

The fifth aspect is a battery according to the first aspect, wherein said input-output terminal is a single jack provided concavely in said battery body.

The sixth aspect is a battery according to the first or second aspect, wherein said input-output terminal includes a first-polarity terminal formed concavely in a tip of said input-output terminal and a second-polarity terminal arranged on an outside of said input-output terminal.

The seventh aspect is a battery according to the first or second aspect, wherein said input-output terminal includes a threaded first-polarity terminal formed in a tip of said input-output terminal and a threaded second-polarity terminal on a base portion of said input-output terminal.

The eighth aspect is a battery according to the second aspect, wherein said input-output terminal includes a threaded first-polarity terminal formed in a tip of said input-output terminal and a threaded second-polarity terminal on a base portion of said input-output terminal, and has a through-hole communicating into an interior of said battery body.

The ninth aspect is a battery according to the preceding aspects, wherein said battery is a cylindrical secondary battery or a rectangular secondary battery.

In accordance with this invention, it is possible to solve problems of troublesome connecting operation and complicated design of the arrangement of the terminals on the instrument, and also solve the problem that the demand of arranging positive and negative terminals on the one end face of the battery cannot be realized because the diameter of the battery is small. Further, the electric appliance whose terminal can be easily designed can be provided.

DESCRIPTION OF THE PREFERRED EMBODIMENTS

The battery according to the this invention is characterized in that it comprises a battery body and a single output terminal fixed thereto and said output terminal includes a positive terminal and a negative terminal electrically insulated from each other. The positive terminal and negative terminal electrically insulated may be arranged in any arbitrary method. In accordance with this invention, it is possible to solve problems of troublesome connecting operation of connecting the battery to the appliance by way of two connecting wires and providing two contacts on the appliance, the problem of complicated design of the arrangement of the terminals on the instrument, and the problem that the demand of arranging positive and negative output terminals on the one end face of the battery cannot be realized because the diameter of the battery is small.

The battery of the present invention can be produced by ordinal manner, and the battery of the present invention can be applied for a various type of battery, such as a lead acid battery, a Ni—Cd (nickel—cadmium) battery, a Ni—MH (nickel-metal hydride) battery, a silver-zinc oxide battery, a lithium ion battery, etc.

The present invention will be further described in the following examples, but the present invention should not be construed as being limited thereto.

EXAMPLES

Figure 1:
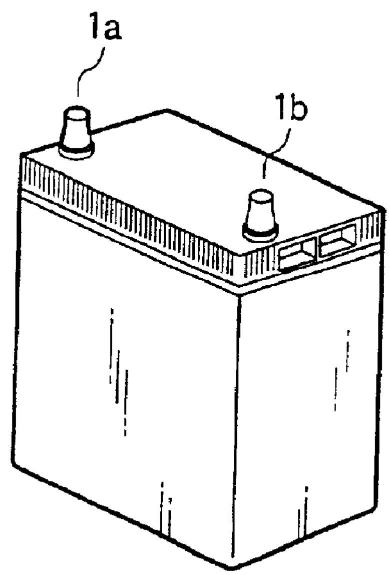
FIG. 1 is an appearance view of a prior art battery.
Figure 2A:
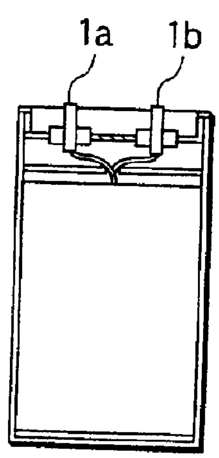
FIGS. 2A and 2B are sectional views of other prior art cylindrical batteries.
Figure 2B:
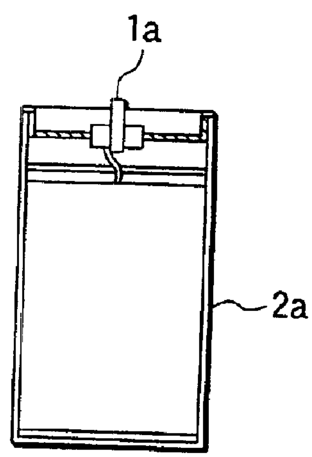
Figure 3:
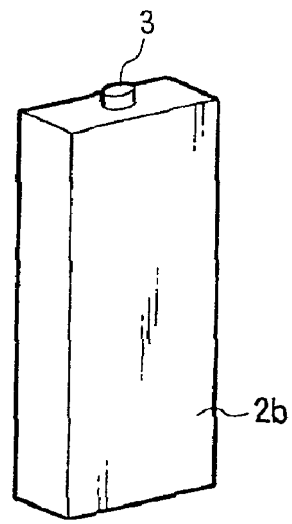
FIG. 3 is an appearance view still another prior art flat rectangular battery.
Figure 4:
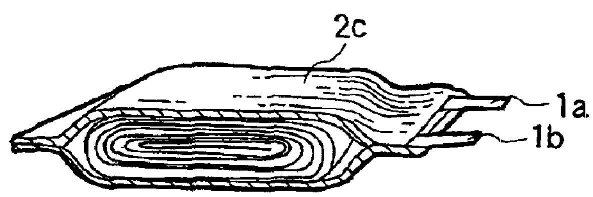
FIG. 4 is a partially cut-away view of a further prior art flat battery.
Figure 5:
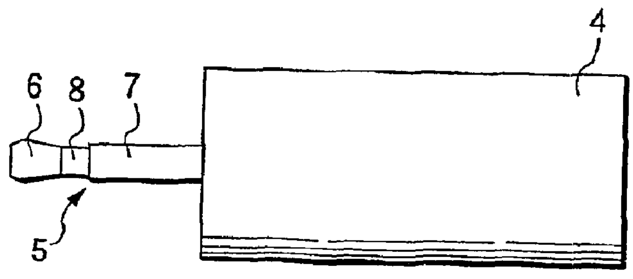
FIG. 5 is a view showing a first embodiment of this invention.

FIG. 5 is a view showing a first embodiment of this invention in which an output terminal 5 which is a single-head plug is provided convexly from the end face of a cylindrical lithium ion battery body 4. In FIG. 5, numeral 6 denotes a positive terminal which is a tip made of free-machining brass; 7 denotes a negative terminal which is a sleeve made of free-machining brass; and 8 denotes an insulating collar made of polyethylene resin. The internal structure of the battery and connection between the output terminal and the electrode, which are not shown, may be realized by an ordinary technique.

Such a battery can operate as a power source for an electric appliance in such a manner connected to the electric appliance by a single-head jack corresponding to the single-head plug. Such a battery which is formed as a secondary battery is subjected to charging in such a manner that it is connected to a charging device through a single-head jack corresponding to the single-head plug. Thus, the connection between the appliance using the battery and the charging device can be executed very easily.

Figure 6A:
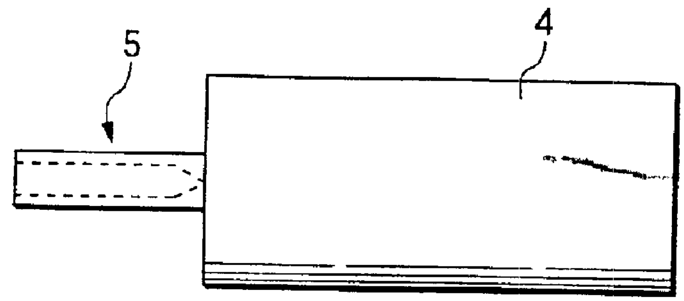
FIG. 6A is an appearance view of a second embodiment of this invention.

FIG. 6A is an appearance view of the second embodiment of this invention. As seen from FIG. 6A, a cylindrical output terminal 5 is provided convexly from the end surface of a flat rectangular battery body 4. The interior of the cylindrical output terminal 5 is configured as a single jack corresponding to the tip or sleeve of the single-head plug. The single-head jack has an electric connecting means to be connected to the single-head plug and a means for preventing removal of the single-head plug. The structure of each of these components, which is well known, is not shown.

Figure 6B:
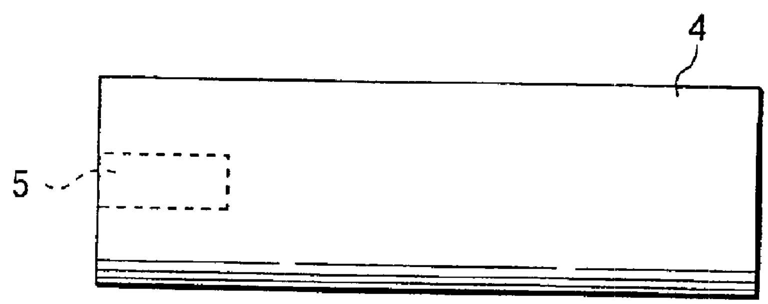
FIG. 6B is an appearance view of a third embodiment of this invention.

FIG. 6B is an appearance view of the third embodiment of this invention. As seen from FIG. 6B, a single-head jack type output terminal 5 is concavely formed in the end surface of a flat rectangular battery body 4. The interior of the output terminal 5, not shown, is basically the same as that shown in FIG. 6A.

Such a battery can operate as a power source for an electric appliance in such a manner that connected to the electric appliance by a single-head jack corresponding to the single-head plug. Such a battery which is formed as a secondary battery is subjected to charging in such a manner that it is connected to a charging device through a single-head jack corresponding to the single-head plug. Thus, the connection between the appliance using the battery and the charging device can be executed very easily.

Figure 7:
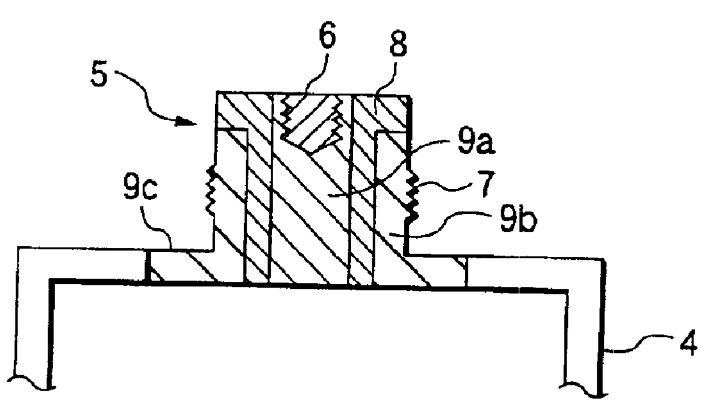
FIG. 7 is a view showing a fourth embodiment of this invention.

FIG. 7 is a view showing the fourth embodiment of this invention in which a single output terminal 5 is attached to the upper surface of the cylindrical battery body 4. The output terminal 5 includes a first terminal member 9*a* whose tip is concavely formed and whose inner face is threaded; a second terminal member 9*b* whose outer face is threaded and whose bottom is provided with a washer 9*c*; and a glass sealing member 8 which insulate and fix the two terminal members 9*a* and 9*b*. In this embodiment, the concave portion 6 at the tip of the first terminal member 9*a* serves as a positive terminal and the second terminal member 9*b* serves as a negative terminal 7, and vice versa.

In use, a conductive bolt with a positive lead wire may be screwed with the concave portion 6, and the negative lead wire may be fixed to the second terminal member 9*b* by a nut. In the same manner, charging for the secondary battery can be carried out.

Figure 8A:
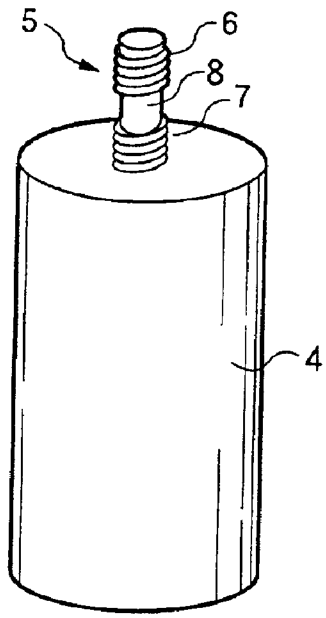
FIGS. 8A and 8B are views showing a fifth embodiment of this invention.
Figure 8B:
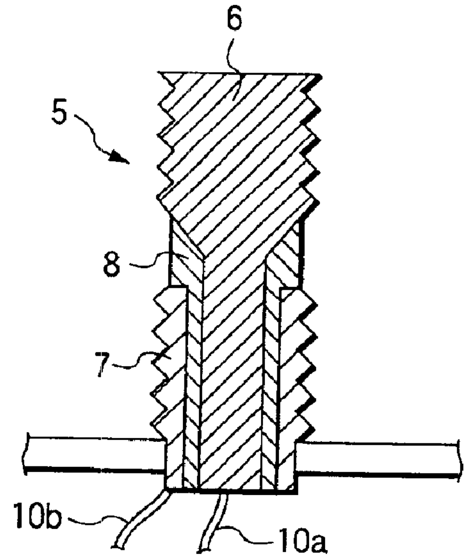

FIGS. 8A and 8B are views showing the fifth embodiment of this invention. FIG. 8A is an appearance view and FIG. 8B is a sectional view of an output terminal 5. In FIGS. 8A and 8B, numeral 4 denotes a body of a cylindrical lead acid battery. Numeral 5 denotes an output terminal provided convexly from the upper surface of the battery body 4. Numeral 6 denotes a positive terminal formed at the upper part of the output terminal 5. Numeral 7 denotes a negative terminal formed at the lower part of the output terminal 5. Numeral 8 denotes a resin insulating member for electrically insulating and securing the positive terminal 6 and negative terminal 7. Numeral 10*a* denotes a wire connecting the positive terminal 6 to the positive electrode plate (not shown) within the battery body. Numeral 10*b* denotes a wire connecting the negative terminal 7 to the negative electrode plate (not shown) within the battery body. In this embodiment, both positive terminal 6 and negative terminal 7 are threaded. On the threaded portion, the wire connecting to the electric appliance is fixed by a nut or is caught by an alligator clip.

In this configuration, since the positive terminal and negative terminal are vertically adjacent to each other, when they are connected to an appliance using the battery or a charging device, it is preferred that a means for preventing short-circuit may be used as required.

Figure 9:
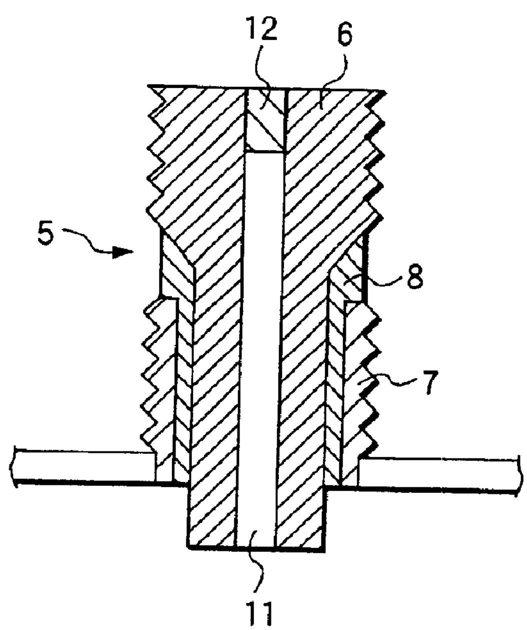
FIG. 9 is a view showing a modification of the output terminal shown in FIGS. 8A and 8B.

FIG. 9 is a view showing a modification of the output terminal shown in FIGS. 8A and 8B. As seen from FIG. 9, the output terminal 5, which is provided convexly from the battery body, is provided with a function of electrolyte injection. In FIG. 9, numeral 5 denotes an output terminal provided convexly from the upper surface of the battery body 4. Numeral 6 denotes a positive terminal formed at the upper part of the output terminal 5. Numeral 7 denotes a negative terminal formed at the lower part of the output terminal 5. Numeral 8 denotes a resin insulating member for electrically insulating and securing the positive terminal 6 and negative terminal 7. The central portion of the output terminal 5 (i.e. positive terminal) is provided with a through-hole 11 communicating into the interior of the battery body and a stopping means 12 for stopping the through-hole.

In this configuration, electrolyte injection into the battery through the through-hole 11 can be implemented so the battery structure can be simplified. Incidentally, the stopping means 12 may be a rubber stopper.

As described above, in accordance with this invention, the battery is provided with a battery body and a single input-output terminal protruding therefrom which has a positive terminal and a negative terminal electrically insulated from each other. Because of such a structure of the battery, it can be easily connected to an electric appliance, and the terminal of the appliance can be easily designed. Where it is difficult to arrange two terminals on the one end surface as in a cylindrical battery having a small diameter, this invention in which a single input-output terminal has only to be arranged is useful in simplifying the battery.

Figure 10:
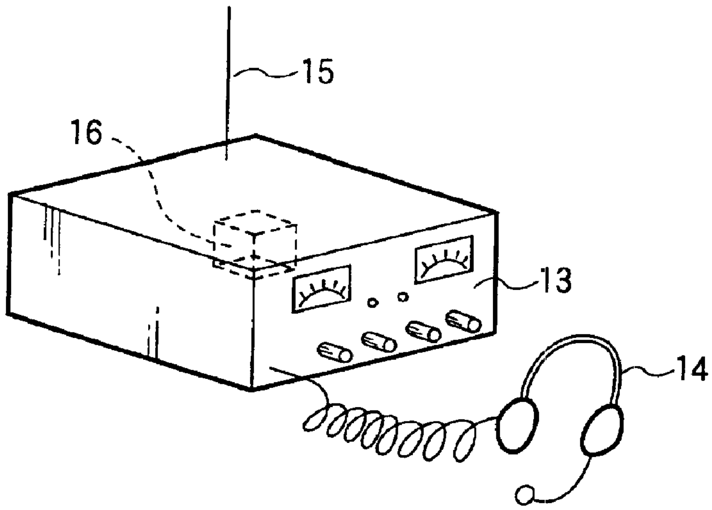
FIG. 10 is a view showing a portable communicating unit in which the battery according to this invention is to be mounted.

FIG. 10 is a view showing a portable communicating unit in which the battery according to this invention is to be mounted. In FIG. 10, numeral 13 denotes a control panel, 14 an audio communicating means (headphone and microphone), 15 an antenna, and 16 a battery mounting portion.

Figure 11:
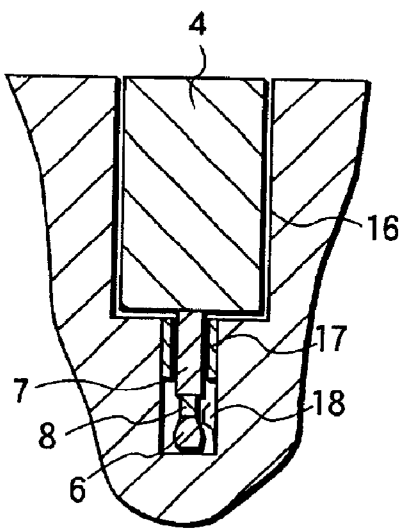
FIGS. 11 and 12 are schematic views showing the states where the battery according to the first embodiment of this invention is mounted in the above portable communicating unit.
Figure 12:
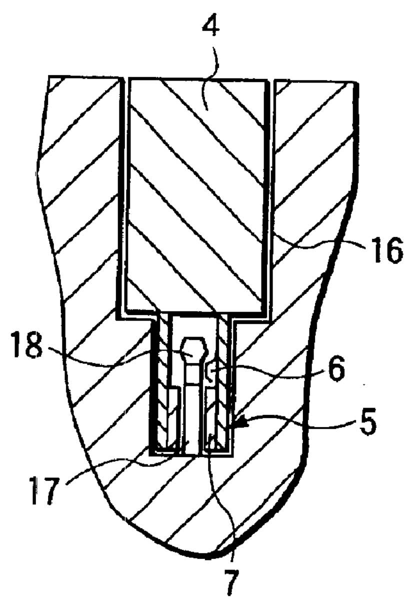

FIGS. 11 and 12 are schematic views showing the states where the battery according to the first embodiment of this invention is mounted in the above portable communicating unit. Specifically, FIG. 11 shows an example in which the portable communicating unit has a single-head jack as a battery connecting means, and FIG. 12 shows another example in which the portable communicating unit has a single-head plug.

In FIG. 11, numeral 16 denotes a battery mounting portion, 4 a battery body having a single-head plug, 6 a positive terminal which is a tip of the single-head plug, 7 a sleeve negative terminal, and 8 an insulating collar made of polyethylene resin. A single-head jack corresponding to the single-head plug is formed on the bottom of the battery mounting portion 16. Numeral 17 denotes a tubular contact which is a negative terminal of an electric appliance and electrically connected to the negative terminal 7 of the single-head plug. Numeral 18 denotes a flat spring-like contact which is a positive terminal of the electric appliance and is electrically connected to the positive terminal 6 of the single-head plug. In this configuration, the battery is electrically connected to the electric appliance.

In FIG. 12, numeral 16 denotes a battery mounting portion, 4 a battery body equipped with an output terminal 5 which a single-head jack, 7 an negative terminal which is a tubular contact arranged at the tip of the single-head jack, 6 denotes a positive terminal which is a flat-spring-like terminal. A single-head plug corresponding to the single-head jack of the battery is formed on the bottom of the battery mounting portion 16. Numeral 18 denotes a tip which is a positive terminal of the electric appliance. Numeral 17 denotes a sleeve which is a negative terminal of the electric appliance. In this configuration, the battery is electrically connected to the electric appliance.

In this way, by using the electric appliance provided with the single-head jack or single-head plug as a battery connecting means, the battery provided with the corresponding single-head plug or single-head jack can be easily mounted in the electric appliance.

Incidentally, in the examples shown in FIGS. 10–12, the single-head jack or single-head plug is integrally attached to the electric appliance using a battery. However, the single-head jack or single-head plug may be separated from the electric appliance so that they may be connected by means of a connecting wire. In this case, the space for mounting the battery can be omitted so that the electric appliance can be miniaturized.

While the invention has been described in detail and with reference to specific embodiments thereof, it will be apparent to one skilled in the art that various changes and modifications can be made therein without departing from the spirit and scope thereof.

This application is based on Japanese patent application No. Hei.11-361927 filed on Dec. 20, 1999, the entire contents of which are incorporated hereinto by reference.

What is claimed is:

1. A battery comprising a battery body and a single input-output terminal disposed directly on said battery body, wherein said input-output terminal includes a positive terminal and a negative terminal which are electrically insulated from each other, said input-output terminal is provided convexly from said battery body, and a tip surface of said input-output terminal has a concavity.

2. A battery according to claim 1, wherein said input-output terminal is a single-head plug.

3. A battery according to claim 1, wherein said input-output terminal is a single-head jack.

4. A battery according to claim 1, wherein an inner face of said concavity is threaded.

5. A battery according to claim 1, wherein said input-output terminal includes a first-polarity terminal formed concavely in a tip surface of said input-output terminal and a second-polarity terminal arranged on an outside of said input-output terminal.

6. A battery according to claim 1, wherein said battery is a cylindrical secondary battery or a rectangular secondary battery.

7. The battery according to claim 1, wherein the positive terminal and the negative terminal are coaxially disposed on the single input-output terminal.

8. A battery according to claim 1, wherein said battery does not comprise any input-output terminals except said single input-output terminal.

9. A battery according to claim 1, wherein said battery is a secondary battery and said single input-output terminal serves as both an input terminal and an output terminal.

10. A battery according to claim 1, wherein an outer face of said single input-output terminal provided convexly from said battery is threaded.

11. A battery comprising a battery body and a single input-output terminal disposed directly on said battery body, wherein said input-output terminal includes a positive terminal and a negative terminal which are electrically insulated from each other, wherein said input-output terminal includes a threaded first-polarity terminal formed in a tip surface of said input-output terminal and a threaded second-polarity terminal on a base portion of said input-output terminal.

12. A battery comprising a battery body and a single input-output terminal disposed directly on said battery body, wherein said input-output terminal includes a positive terminal and a negative terminal which are electrically insulated from each other, wherein said input-output terminal is provided convexly from said battery body, wherein said input-output terminal includes a threaded first-polarity terminal formed in a tip surface of said input-output terminal and a threaded second-polarity terminal on a base portion of said input-output terminal, and has a through-hole communicating into an interior of said battery body.

* * * * *